(12) United States Patent
Strauß et al.

(10) Patent No.: US 11,927,220 B2
(45) Date of Patent: Mar. 12, 2024

(54) METHOD AND SYSTEM FOR PRODUCING A GEAR UNIT

(71) Applicant: SEW-EURODRIVE GMBH & CO. KG, Bruchsal (DE)

(72) Inventors: Dietmar Strauß, Bruchsal (DE); Christoph Ruppaner, Kraichtal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 18/017,689

(22) PCT Filed: Jun. 24, 2021

(86) PCT No.: PCT/EP2021/067391
§ 371 (c)(1),
(2) Date: Jan. 24, 2023

(87) PCT Pub. No.: WO2022/017720
PCT Pub. Date: Jan. 27, 2022

(65) Prior Publication Data
US 2023/0279904 A1   Sep. 7, 2023

(30) Foreign Application Priority Data
Jul. 24, 2020   (DE) .......................... 102020004494.8

(51) Int. Cl.
*F16C 43/04*   (2006.01)
(52) U.S. Cl.
CPC .......... *F16C 43/04* (2013.01); *F16C 2361/61* (2013.01)
(58) Field of Classification Search
CPC .... F16C 43/04; F16C 2361/61; F16C 33/723; F16C 41/04; F16C 35/063; F16C 35/067; F16C 19/364
See application file for complete search history.

(56) References Cited

U.S. PATENT DOCUMENTS 9,284,949 B2   3/2016   Pick
10,527,152 B2   1/2020   Wu
(Continued)

FOREIGN PATENT DOCUMENTS

DE   102008036223 A1   2/2010
DE   102013018710 A1   5/2015
(Continued)

OTHER PUBLICATIONS

International Report on Patentability issued in corresponding International Application No. PCT/EP2021/067391 dated Jan. 24, 2023, pp. 1-6, English Translation.
(Continued)

*Primary Examiner* — Lee A Holly
(74) *Attorney, Agent, or Firm* — CARTER, DELUCA & FARRELL LLP

(57) ABSTRACT

In a method and system for producing a gear unit that includes a housing and a shaft with bearing(s), the housing having lower upper parts, and a bearing seat: the bearing is fitted onto the shaft, the outer ring of the bearing being limited axially by a retainer attached to the shaft; the shaft, bearing, and retainer are inserted into the lower part; the upper part is fitted onto and connected to the lower part, the bearing being received by first and second sub-regions; a shim ring is placed against the outer ring; screws are screwed into axially oriented threaded holes of the housing such that the shim ring is limited by the screw heads of the screws; and the retainer is removed and a bearing cover is connected to the housing and axially limits the shim ring.

20 Claims, 6 Drawing Sheets

(56) References Cited

U.S. PATENT DOCUMENTS

2006/0002644 A1  1/2006 Mitsue
2014/0178119 A1  6/2014 Shinohara

FOREIGN PATENT DOCUMENTS

DE  102013226552 B3  5/2015
WO  2013152850 A1  10/2013

OTHER PUBLICATIONS

International Search Report issued in corresponding International Application No. PCT/EP2021/067391 dated Sep. 23, 2021, pp. 1-2, English Translation.

METHOD AND SYSTEM FOR PRODUCING A GEAR UNIT

FIELD OF THE INVENTION

The present invention relates to a method and a system for producing a gear unit.

BACKGROUND INFORMATION

In certain conventional systems, radially acting forces effect axial force components in angular contact bearings.

A fastening method for rotating machines is described in U.S. Patent Application Publication No. 2014/0178119.

A bearing arrangement for a wheel is described in U.S. Patent Application Publication No. 2006/0002644.

A mounting device for a roller bearing is described in German Patent Document No. 10 2013 226 552.

A gear unit having a housing is described in German Patent Document No. 10 2013 018 710.

SUMMARY

Example embodiments of the present invention provide for maintenance of gear units as independently as possible from the installation position of the gear unit in an industrial plant.

According to an example embodiment of the present invention, in a method for producing a gear unit that includes a housing and a shaft with at least one bearing, the housing including a lower part, an upper part, and a bearing seat adapted to receive the bearing, the upper part adapted to be fitted onto the lower part, a first sub-region of the bearing seat, e.g., a first half of the bearing seat, being arranged on the lower part, a second sub-region of the bearing seat, e.g., the other half of the bearing seat, being arranged on the upper part, the bearing being arranged as a roller bearing and including an inner ring, roller bodies, and an outer ring: the bearing is placed onto the shaft and the outer ring of the bearing is limited axially by a retaining device attached to the shaft; the shaft, together with bearing and retaining device, is inserted into the lower part, e.g., the bearing, the outer ring of the bearing, etc., being received by the first sub-region; the upper part is fitted onto the lower part and connected to the lower part, e.g., by screws, the bearing being received by the first sub-region and by the second sub-region; a shim ring is placed against the outer ring; screws are screwed into threaded holes, e.g., axially oriented threaded holes, of the housing, e.g., of the lower part and upper part, the screw heads of the screws, or washers arranged on the screws, projecting radially, e.g., radially inwardly, on the housing such that the shim ring is limited by the screw heads or by the washers; and the retaining device is removed and a bearing cover is connected to the housing and axially limits the shim ring, and thus the outer ring.

Thus, the shaft can be mounted when in a horizontal orientation. This is because although the force of gravity as a radial force effects an axial force component that tends to push the outer ring axially out of the bearing, the axial freedom of movement of the outer ring measured relative to the shaft is limited by the retaining device. The retaining device may be arranged as a spring part or as a solid part. Attaching the retaining device in the shaft is provided using a centric threaded hole in the end face of the shaft, into which threaded hole a screw is screwed that, for example, presses a disk towards the inner ring and a retaining ring supported on the disk towards the outer ring. The retaining ring is, for example, arranged as a conically shaped perforated disk.

Thus, therefore, the outer ring is prevented from moving axially out of the outer ring. The exchange or installation of the bearing with any orientation of the shaft in space is thus provided. Therefore, maintenance of gear units can be carried out regardless of the installation position of the gear unit in an industrial plant.

Structurally, for carrying out the method, only one centric threaded hole is needed on the shaft for attaching the retaining device, which, however, may be removed after the shim disks have been added and axially secured using screws, and then high axial forces occurring during operation can be absorbed by mounting the bearing cover.

Example embodiments of the present invention may be used for industrial gear units having a total mass of more than 100 kg.

The retaining device limits the outer ring axially. The outer ring can only move counter to this direction using pressure by the roller bodies towards the inner ring. However, the inner ring is positioned against a step of the shaft, so that a limit is reached in this direction, as well.

According to example embodiments, the retaining device is arranged as a spring part that can be attached to and supported on the shaft, and the spring part presses against the outer ring of the bearing, e.g., axially. Thus, a resilient pressure having an essentially constant force is provided.

According to example embodiments, the retaining device is arranged as a disk with a retaining ring attached to the shaft by a screw screwed into a threaded hole of the shaft. Thus, the retaining device can be assembled in several pieces from elements that are simple to produce.

According to example embodiments, the disk has an axially projecting collar edge that presses against the inner ring. Thus, the collar edge can be produced using shaping, and the disk can be aligned in that it rests against the finely worked end face of the shaft. Thus, the collar edge is also aligned precisely, and uniform pressure on the circumference of the inner ring can achieved.

According to example embodiments, the disk has an inner edge on which the radially inner edge of a retaining ring is supported, and the radially outer edge is supported on the outer ring. Thus, an arrangement for pressing and axially limiting the outer ring is achieved, and the outer ring is spaced apart from the disk radially. The retaining ring bridges the radial distance and transmits the axial pressing force.

According to example embodiments, the retaining ring is a conically shaped punch disk. Thus, production is achieved, because the punch disk only has to pressed onto a cone for shaping it, and thus it can be readily produced.

According to example embodiments, the axial direction is oriented parallel to the rotational axis of the shaft. Thus, mounting the shaft with a horizontal orientation is made possible.

According to example embodiments, the shim disk is arranged radially outside of the retaining ring, and, for example, the radial spacing region covered by the shim disk is adjacent to the radial spacing region covered by the retaining ring. Thus, the shim disk can be placed radially outside of the retaining ring on the outer ring, and the shim disk can be placed while the outer ring is still axially secured.

According to example embodiments, the bearing cover has recesses, e.g., notches, into which the screws attached to the housing project. Thus, the temporarily required axial securing of the shim disk is made possible by the screws being screwed in and unscrewing is not necessary. Increased safety is achieved in this manner. For example, during maintenance the bearing cover is removable and yet the shim disk is still secured axially. It is, thus, possible to carry out the entire method in reverse. This is also possible during recycling or reprocessing of the gear unit, which can be economic for large gear units.

According to example embodiments, the bearing cover is connected to the housing by further screws and limits the shim disk axially, and, for example, the shim disk is arranged axially between the bearing cover and the outer ring. Thus, high axial forces can be absorbed during operation.

According to example embodiments, the rotational axes of the roller bodies are tangents of a cone, the tip of which is a shorter distance to the bearing cover or to the disk than to the shaft. Thus, the bearing can be arranged as a conical roller bearing.

According to an example embodiment of the present invention, a system, e.g., for carrying out the method described herein, includes a housing and a shaft arrangement that has a shaft and a bearing fitted onto the shaft, e.g., an angular contact bearing, a conical roller bearing, etc. The bearing includes an inner ring, an outer ring, and roller bodies. A retaining device attached to the shaft is arranged as an axial limit for the outer ring and inner ring.

Thus, a retaining device for axially limiting the outer ring provides for mounting regardless of the orientation. For example, the shaft can be inserted into the housing, e.g., into the lower part of the housing, in a horizontal orientation.

According to example embodiments, on its end face facing the retaining device, the shaft has a centric threaded hole into which a screw is screwed, the screw head of which presses against a disk. An axially projecting collar edge of the disk presses against the inner ring of the bearing, and the disk presses against the outer ring. Thus, the shaft must be provided with a threaded hole, and a smaller mass and moment of inertia can be attained.

According to example embodiments, the inner ring is positioned against a shaft shoulder, e.g., against a step arranged on the shaft. Thus, the shaft shoulder is readily produced.

According to example embodiments, arranged on the lower part of the housing of the gear unit is a sub-region of a bearing seat in which the outer ring of the bearing is received. Thus, the bearing can be lowered into the bearing seat and is thereby received. Thus, after lowering, part of the bearing, e.g., half of the bearing, is received in the lower part. Then, the upper part can be fitted onto the lower part, and, thus, the bearing can be received in the rest of the bearing seat of the upper part.

Further features and aspects of example embodiments of the present invention are described in greater detail below with reference to the appended schematic Figures.

DETAILED DESCRIPTION

Figure 1:
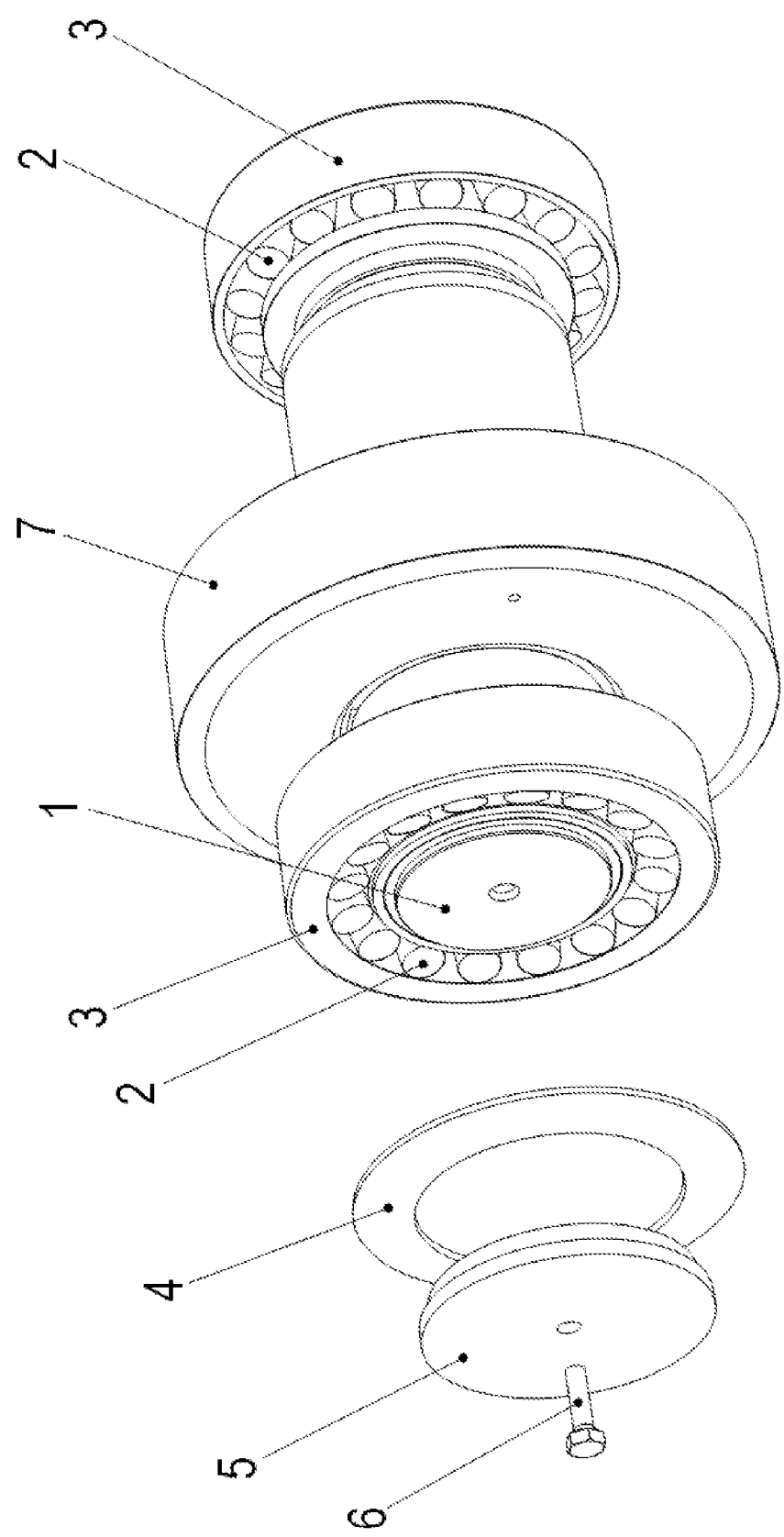
FIG. 1 illustrates producing a gear unit, in which a retaining ring 4 is axially limited by a disk 5 for fixing an outer ring 3 of a bearing for a shaft 1.

As schematically illustrated in the Figures, a shaft 1 of the gear unit is rotatably mounted by a conical roller bearing.

The gear unit is, for example, arranged as an industrial gear unit, the mass of which is more than 100 kg, e.g., more than 1000 kg.

The production method is suitable for mounting the shaft 1 when oriented horizontally, e.g., for inserting the same into the gear unit.

To this end, the gear unit has a divided housing, e.g., a split housing, in which the housing has a lower part and an upper part that can be fitted thereon.

Each bearing has an inner ring 20 that is placed onto the shaft 1, and an outer ring 3 that radially surrounds the roller bodies 2 of the specific bearing arranged between the inner ring 20 and the outer ring 3.

Since the roller bodies are cylindrical, but the rotational axes of the roller bodies 2 are oriented as tangents on a taper, e.g., a cone, an axially oriented force acts on the outer ring 3 and could cause slipping of the outer ring 3.

To prevent this, the auxiliary device is added.

The bearing receiving unit arranged on the housing, e.g., the bearing seat, is divided into the lower part 30 of the housing and the upper part.

For example, the upper part is arranged mirror-symmetrically to the lower part 30 and thus half of the bearing receiving unit is arranged in the lower part 30 and the other half in the upper part. Because the bearing seat is divided in half, it is possible to insert the shaft from the vertical direction.

The shaft 1 is, for example, oriented horizontally.

Figure 2:
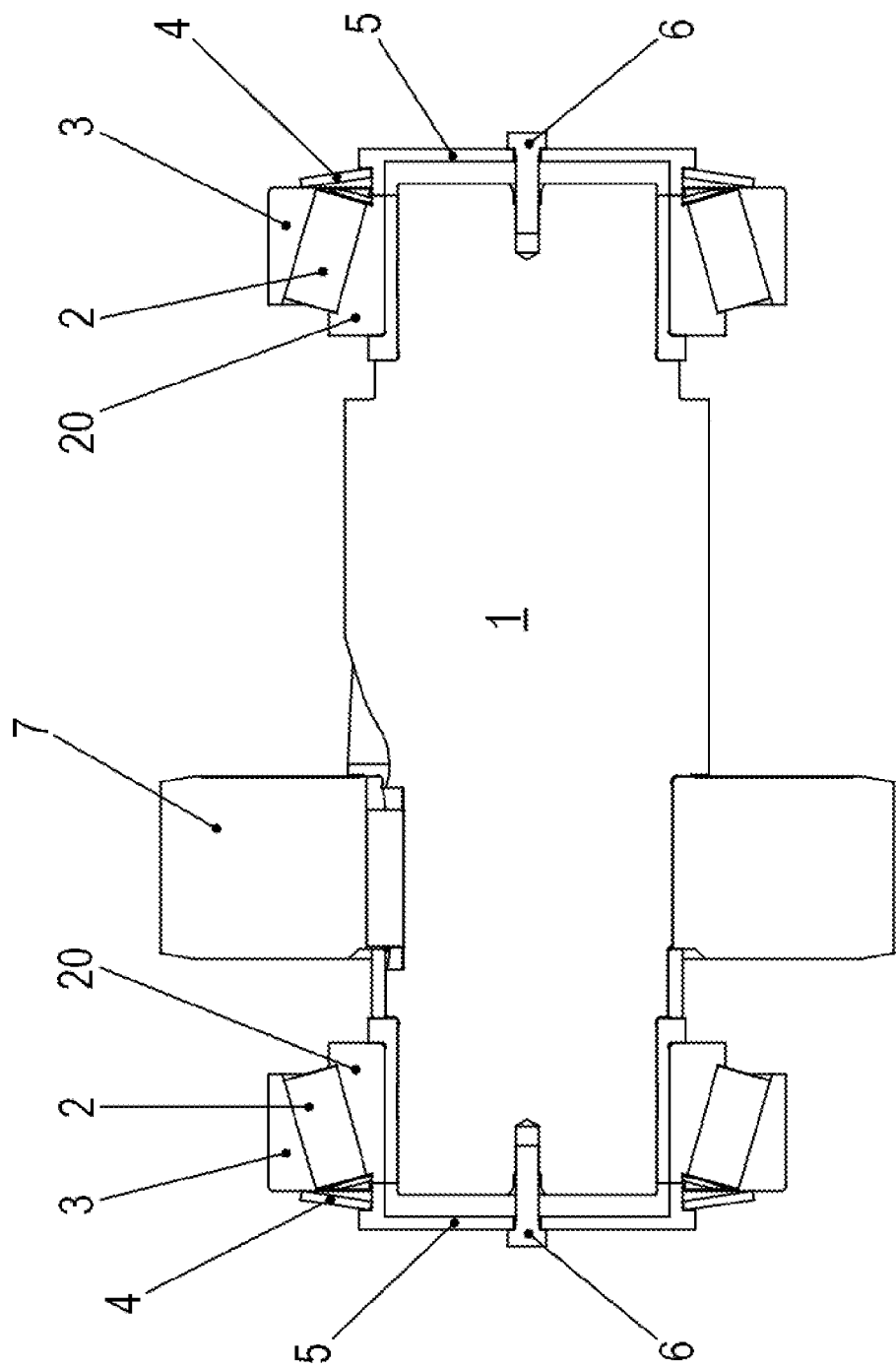
FIG. 2 illustrates the results of the production illustrated in FIG. 1.

FIG. 2 illustrates the bearing premounted and axially secured on the shaft 1.

A screw 6 is provided in a screw 6 inserted centrally into the shaft 1. For this purpose, the shaft 1 has a threaded hole, arranged coaxially with the rotational axis and, for example, oriented axially, into which the screw 6 is screwed and the screw head of which presses, directly or via an interposed washer, a disk 5 against the retaining ring 4 which thus presses against the outer ring 3. Thus, it is possible to prevent the outer ring 3 from slipping.

As illustrated in FIG. 2, the disk is supported on the inner ring 20 to limit the pressure.

To this end, the disk has an axially projecting collar edge that rests against the inner ring 20. The retaining ring 4, e.g., its radial inner wheel, rests in a circumferentially circumferential step of the disk 5 with a circumferentially likewise circumferential inner edge between this collar edge and the base body of the disk 5. The radial outer edge of the retaining ring 4 rests against the outer ring 3.

The retaining ring 4 is conically shaped. Thus, for production, a perforated disk can be used that is pressed onto a taper oriented coaxially with the ring axis of the perforated ring and is thus conically formed.

The inner ring 20 of the bearing is positioned against a step of the shaft 1.

The collar edge of the disk 5 rests against the inner ring 20 and is spaced apart from the shaft 1, e.g., although the axial region covered by the shaft 1 overlaps with the axial region covered by the disk 5.

The toothed wheel 7 is attached rotation-fast on the shaft 1. The shaft 1 can thus be used as the output shaft of the gear unit.

The axial region covered by the inner ring 20 is adjacent to the axial region covered by the disk 5.

Figure 3:
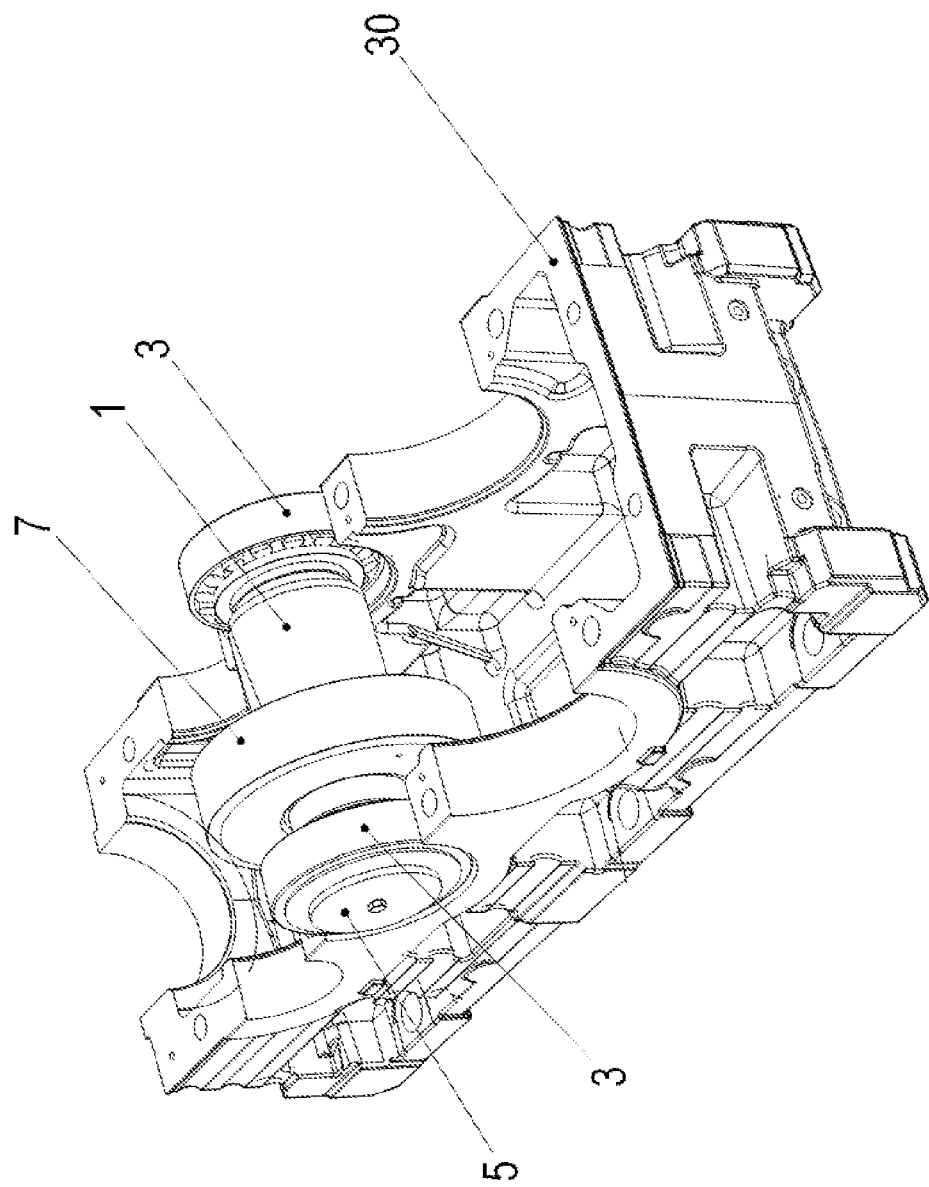
FIG. 3 illustrates inserting the shaft 1 into a lower part of a housing of the gear unit.

Thus, in the first production step, if the specific bearing is placed onto the shaft and the specific outer ring 3 is limited by the retaining ring 4, the shaft thus pre-completed with bearings, the rotational axis of which is oriented horizontally, is inserted from the vertical direction into the bearing seat provided on the lower part 30, and the outer ring 3 is inserted into the region of the bearing seat present on the lower part 30, as illustrated in FIG. 3.

Then, the upper part of the housing is fitted onto the upper part 30 such that the region of the bearing seat formed on the upper part of the housing surrounds and contacts the outer ring 3. In this manner, the outer ring 3, after the fitting on, is received with no disruptions in the entire bearing seat formed from the lower part 30 and the upper part.

Figure 4:
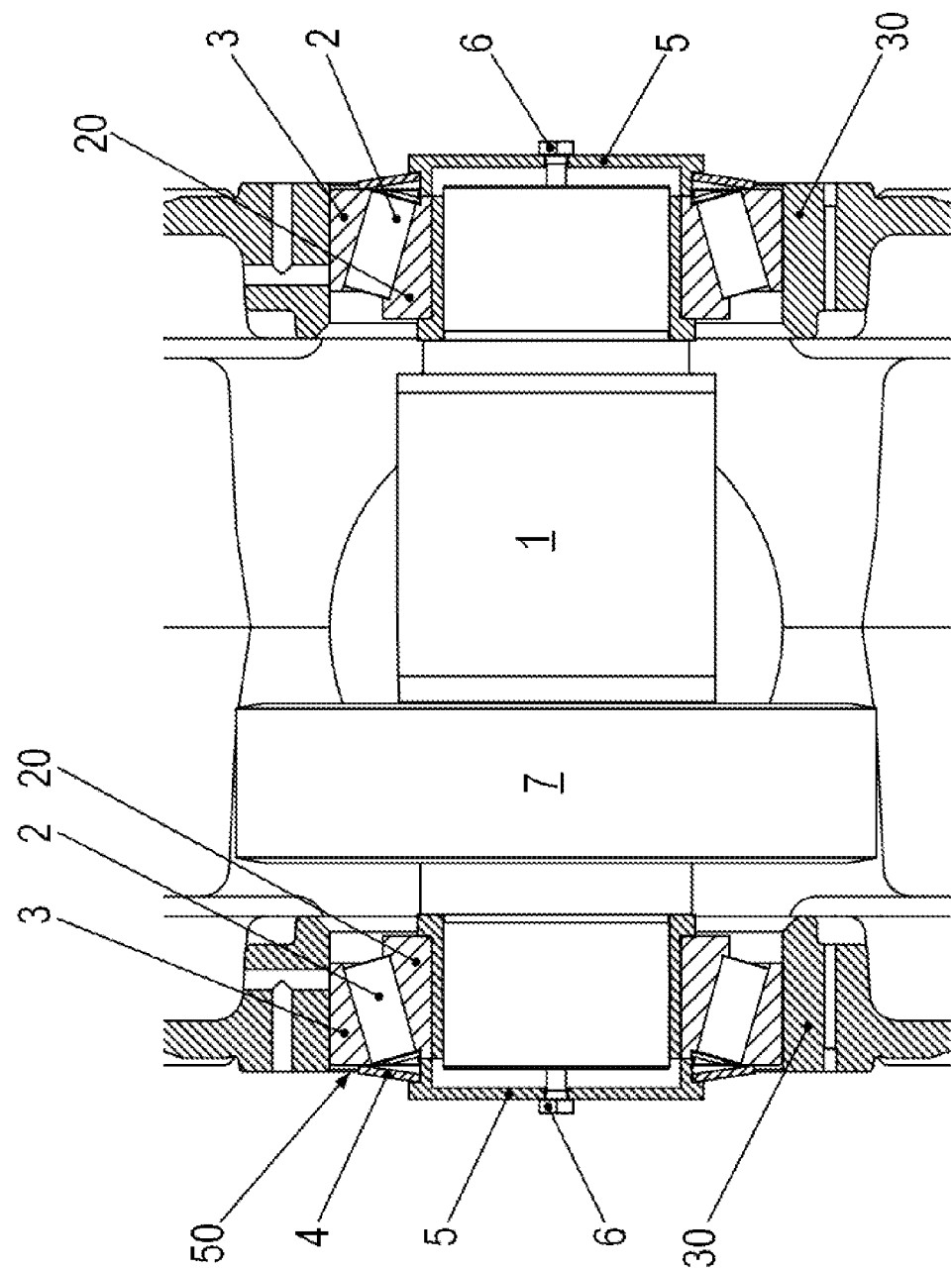
FIG. 4 illustrates adding a shim disk 50.

As FIG. 4 illustrates, then, in a next production step, shim disks 50 are placed against the outer ring 3 and compensate, at least nearly or as much as possible, the distance between the outer side of the housing and the shoulder, e.g., the outer corner, of the outer ring 3, e.g., down to a clearance.

Figure 5:
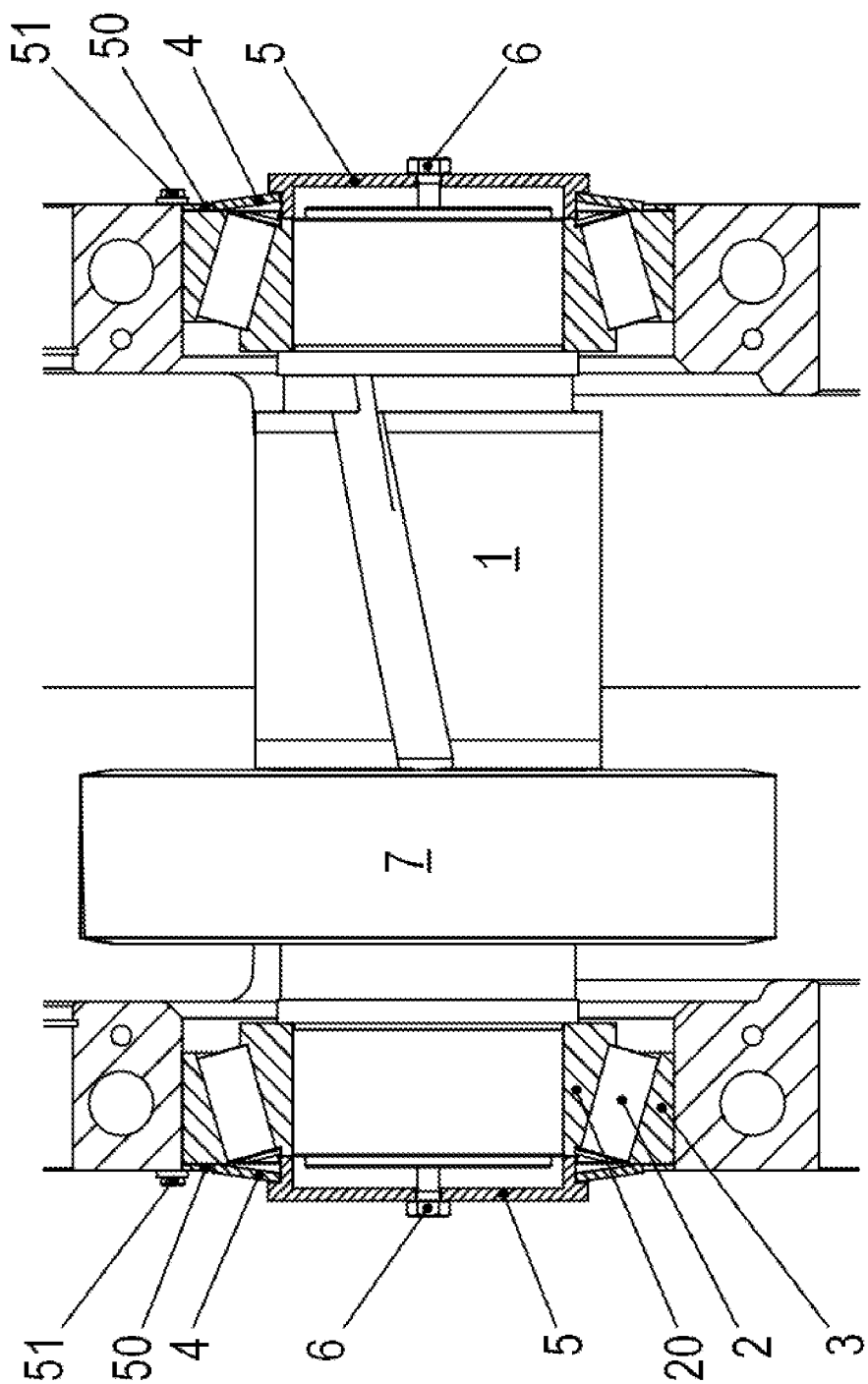
FIG. 5 illustrates securing the shim disk 50 by a screw 51.

As illustrated in FIG. 5, screws 51 are screwed into threaded bores of the housing, e.g., of the lower part or the upper part, so that the screw heads axially secure the shim disks, indirectly via washers interposed between the specific screw head and the housing or alternatively directly themselves.

Figure 6:
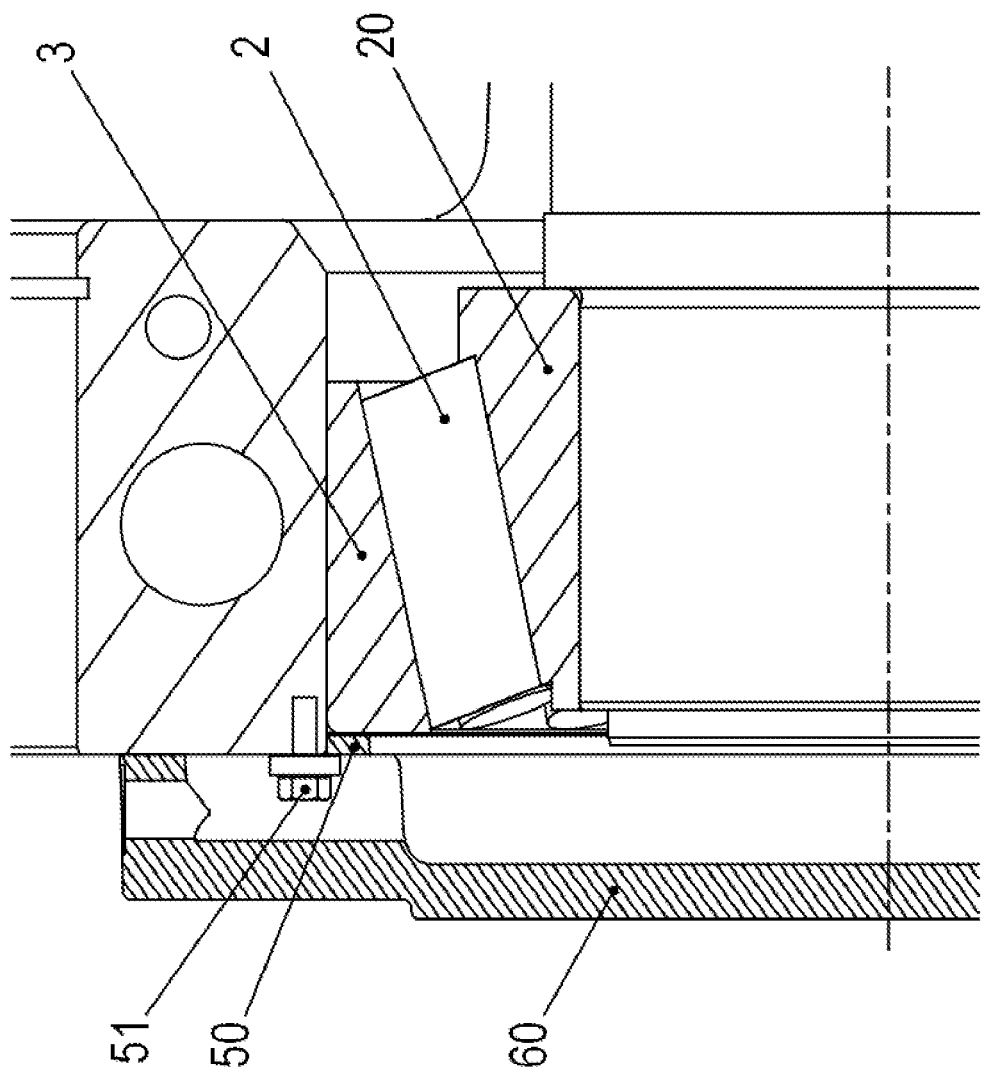
FIG. 6 illustrates attaching a bearing cover 60 having a recess for the screw 51 and axially limiting the shim disk 50.

As illustrated in FIG. 6, if the screw 6 is unscrewed, the disk 5 is removed and the retaining ring 4 is also removed. This is because the screws 51 can limit the outer ring 3 axially. Then, the bearing cover 60 is attached by screws to the housing, e.g., to the lower part 30 and upper part.

The bearing cover 60 has notches, e.g., recesses, so that the screws 51 are spaced apart from the bearing cover 60 axially and radially, but the radial spacing region covered by the screw 51 is arranged within the radial spacing region covered by the bearing cover 60.

In the circumferential direction, between the screws 51 arranged on the circumference on the same radial spacing region, the bearing cover 60 has crosspieces that extend radially and that rest against both the shim disk 50 and the side of the housing facing the bearing cover 60, so that the shim disks 50 are substantially limited by the bearing cover 60.

The bearing cover 60 covers the bearing against the surroundings. To this end, the radial spacing region covered by the bearing cover 60 includes the radial spacing region included by the shaft 1 and the radial spacing region covered by the bearing, e.g., inner ring 20, roller bodies 2, and outer ring 3, and overlaps with the radial spacing region covered by the housing.

The bearing cover 60 is dimensioned such that it absorbs the axial forces occurring in operation. The screw 51 is only dimensioned such that the assembly can be carried out, that is, the dead weight can be carried.

The axial direction is oriented parallel to the rotational axis of the shaft 1.

According to exemplary embodiments, spacing elements are used in addition to or alternatively to the shim disks 51.

According to exemplary embodiments, a spring part supported on a punch part is used instead of the disk 5 and the retaining ring 4, so that a substantially constant force is supplied instead of shaping.

According to exemplary embodiments, a further toothed part is attached rotatably-fixed on the shaft so that the shaft can be used as an intermediate shaft of the gear unit.

LIST OF REFERENCE NUMERALS

1 Shaft
2 Roller bodies
3 Outer ring
4 Retaining ring
5 Disk
6 Screw
7 Toothed wheel
20 Inner ring
30 Lower part of the housing
50 Shim disk
51 Screw
60 Bearing cover

The invention claimed is:

1. A method for producing a gear unit that includes a housing, a shaft, and at least one bearing arranged as a roller bearing and including an inner ring, roller bodies, and an outer ring, the housing including a bearing seat adapted to receive the bearing, a lower part including a first sub-region of the bearing seat, and an upper part adapted to fit onto the lower part and including a second sub-region of the bearing seat, comprising:

fitting the bearing onto the shaft and axially limiting the outer ring of the bearing by a retainer attached to the shaft;

inserting the shaft, bearing, and retainer into the lower part;

fitting the upper part onto the lower part and connecting the upper part to the lower part, the bearing being received by the first sub-region and by the second sub-region;

arranging a shim ring against the outer ring;

screwing screws into threaded holes of the housing, screw heads of the screws and/or washers arranged on the screws projecting radially on the housing to limit the shim ring; and removing the retainer and connecting a bearing cover to the housing that axially limits the shim ring and the outer ring.

2. The method according to claim 1, wherein the retainer is arranged as a disk having a retaining ring attached to the shaft by a screw screwed into a threaded hole of the shaft.

3. The method according to claim 2, wherein the disk includes an axially projecting collar edge that presses against the inner ring.

4. The method according to claim 2, wherein the disk includes an inner edge on which a radially inner edge of the retaining ring is supported, and a radially outer edge is supported on the outer ring.

5. The method according to claim 2, wherein the retaining ring is arranged as a conically shaped punch disk.

6. The method according to claim 2, wherein rotational axes of the roller bodies are arranged as tangents of a cone, tip of which is a shorter distance to the bearing cover or to the disk than to the shaft.

7. The method according to claim 1, wherein the shim disk is arranged radially outside of the retainer.

8. The method according to claim 7, wherein a radial spacing region covered by the shim disk is adjacent to a radial spacing region covered by the retainer.

9. The method according to claim 1, wherein the bearing cover is connected to the housing by further screws and is adapted to limit the shim disk axially.

10. The method according to claim 9, wherein the shim disk is arranged axially between the bearing cover and the outer ring.

11. The method according to claim 1, wherein the first sub-region of the bearing seat includes a first half of the bearing seat and the second sub-region of the bearing seat includes a second half of the bearing seat.

12. The method according to claim 1, wherein the inserting includes receiving the bearing and/or the outer ring of the bearing in the first sub-region, the connecting of the upper part to the lower part including screw-connecting the upper part to the lower part, the screw heads of the screws and/or the washers projecting radially inwardly on the housing to limit the shim ring, the threaded holes including axially oriented threaded holes of the upper part and the lower part of the housing.

13. The method according to claim 1, wherein the retainer is arranged as a spring part adapted to be attached to and supported on the shaft and adapted to press against the outer ring of the bearing and/or axially press against the outer ring of the bearing.

14. The method according to claim 1, wherein the axial direction is oriented parallel to a rotational axis of the shaft.

15. The method according to claim 1, wherein the bearing cover includes recesses and/or notches into which the screws attached to the housing project.

16. A system adapted to perform the method as recited in claim 1, comprising:

the housing and a shaft arrangement that includes the shaft and the bearing fitted onto the shaft, the bearing including the inner ring, the outer ring, and the roller bodies; and the retainer attached to the shaft arranged as an axial limit for the outer ring and inner ring.

17. The system according to claim 16, wherein the bearing is arranged as an angular contact bearing and/or a conical roller bearing.

18. The system according to claim 16, wherein the shaft includes an end face facing the retainer, at the end face, the shaft having a centric threaded hole into which a screw is screwed, a screw head of the screw pressing against a disk, an axially projecting collar edge of the disk pressing against the inner ring of the bearing, the disk pressing against the outer ring.

19. The system according to claim 16, wherein the inner ring is positioned against a shaft shoulder and/or against a step arranged on the shaft.

20. The system according to claim 16, wherein the lower part of the housing of the gear unit includes a sub-region of a bearing seat in which the outer ring of the bearing is arranged.

* * * * *